US012798160B2

(12) United States Patent
Elsey

(10) Patent No.: US 12,798,160 B2
(45) Date of Patent: Nov. 17, 2026

(54) DEVICE FOR MAKING AN OBJECT AND A METHOD FOR MAKING AN OBJECT

(71) Applicant: Zydex Pty Ltd, Alexandria (AU)

(72) Inventor: Justin Elsey, Alexandria (AU)

(73) Assignee: Zydex Pty Ltd, Alexandria (AU)

( * ) Notice: Subject to any disclaimer, the term of this patent is extended or adjusted under 35 U.S.C. 154(b) by 39 days.

(21) Appl. No.: 19/088,414

(22) Filed: Mar. 24, 2025

(65) Prior Publication Data

US 2026/0008209 A1 Jan. 8, 2026

Related U.S. Application Data

(63) Continuation of application No. 18/204,401, filed on Jun. 1, 2023, now Pat. No. 12,275,170, which is a (Continued)

(30) Foreign Application Priority Data

May 29, 2012 (AU) ................................ 2012902224

(51) Int. Cl.

| | |
|---|---|
| ***B29C 64/124*** | (2017.01) |
| ***B29C 35/08*** | (2006.01) |
| ***B29C 64/135*** | (2017.01) |
| *B33Y 10/00* | (2015.01) |
| *B33Y 30/00* | (2015.01) |
| *B33Y 50/02* | (2015.01) |

(52) U.S. Cl.

CPC ...... *B29C 35/0805* (2013.01); *B29C 35/0888* (2013.01); *B29C 64/124* (2017.08); *B29C 64/135* (2017.08); *B29C 2035/0833* (2013.01); *B33Y 10/00* (2014.12); *B33Y 30/00* (2014.12); *B33Y 50/02* (2014.12)

(58) Field of Classification Search

CPC ... B29C 64/232; B29C 64/227; B29C 64/245; B33Y 50/02; B33Y 30/00; B33Y 10/00

See application file for complete search history.

(56) References Cited

U.S. PATENT DOCUMENTS 6,126,884 A * 10/2000 Kerekes ................ B33Y 10/00 425/375

6,562,278 B1 * 5/2003 Farnworth .......... B81C 99/0025

(Continued)

*Primary Examiner* — Andrew D Graham

(74) *Attorney, Agent, or Firm* — Christensen, Fonder, Dardi & Busse PLLC; John P. Fonder

(57) ABSTRACT

A method for making a stereolithographic object, including: releasing at least one fastener immobilizing at least one joint between a fabrication platform and bracket to which the fabrication platform is pivotably attached, such that the fabrication platform is pivotable with respect to the bracket; unreleasing the at least one fastener; disposing a radiation hardenable material into a vessel for receiving a radiation hardenable material and having an actinic radiation transparent portion transparent to the actinic radiation; operating an actinic radiation source to generate the actinic radiation; illuminating with the actinic radiation the radiation hardenable material through the actinic radiation transparent portion, the actinic radiation transparent portion being intermediate the stereolithographic radiation source and the fabrication platform; and translating the bracket towards the vessel and away from the vessel.

20 Claims, 9 Drawing Sheets

Related U.S. Application Data continuation of application No. 16/923,290, filed on Jul. 8, 2020, now Pat. No. 11,673,296, which is a continuation of application No. 14/403,227, filed as application No. PCT/AU2013/000562 on May 29, 2013, now Pat. No. 10,766,170.

(56) References Cited

U.S. PATENT DOCUMENTS

| | | | | | |
|---|---|---|---|---|---|
| 7,785,093 | B2 * | 8/2010 | Holmboe | B33Y 70/00 | 425/185 |
| 8,110,135 | B2 * | 2/2012 | El-Siblani | B33Y 70/10 | 264/480 |
| 2002/0155189 | A1 * | 10/2002 | John | B29C 64/129 | 425/375 |
| 2003/0043360 | A1 * | 3/2003 | Farnworth | B29C 64/135 | 430/311 |
| 2004/0035542 | A1 * | 2/2004 | Ederer | B29C 41/34 | 164/412 |
| 2006/0022379 | A1 * | 2/2006 | Wicker | B33Y 70/00 | 264/401 |
| 2006/0192312 | A1 * | 8/2006 | Wahlstrom | B29C 64/135 | 425/375 |
| 2006/0225834 | A1 * | 10/2006 | Medina | B33Y 10/00 | 156/305 |
| 2007/0075461 | A1 * | 4/2007 | Hunter | B29C 64/245 | 425/174 |
| 2009/0309267 | A1 * | 12/2009 | Boot | B29C 64/135 | 425/117 |
| 2010/0100222 | A1 * | 4/2010 | Skubic | B29C 64/245 | 700/110 |
| 2010/0125356 | A1 * | 5/2010 | Shkolnik | B29C 64/129 | 700/118 |
| 2010/0262272 | A1 * | 10/2010 | Shkolnik | B33Y 50/02 | 700/120 |
| 2011/0001272 | A1 * | 1/2011 | Honda | B33Y 40/00 | 264/401 |
| 2011/0089610 | A1 * | 4/2011 | El-Siblani | B29C 64/245 | 425/89 |
| 2012/0168989 | A1 * | 7/2012 | Vermeer | B29C 64/129 | 264/401 |
| 2013/0001834 | A1 * | 1/2013 | El-Siblani | B29C 64/124 | 264/401 |
| 2013/0004607 | A1 * | 1/2013 | Hoechsmann | B29C 64/232 | 425/112 |
| 2013/0270746 | A1 * | 10/2013 | Elsey | B33Y 10/00 | 264/129 |
| 2014/0265034 | A1 * | 9/2014 | Dudley | B33Y 30/00 | 264/401 |
| 2014/0339741 | A1 * | 11/2014 | Aghababaie | B29C 64/124 | 264/401 |
| 2015/0258732 | A1 * | 9/2015 | Stampfl | B33Y 10/00 | 264/401 |

* cited by examiner

DEVICE FOR MAKING AN OBJECT AND A METHOD FOR MAKING AN OBJECT

CROSS-REFERENCE TO RELATED APPLICATIONS

The present application is a continuation of U.S. patent application Ser. No. 18/204,401, filed Jun. 1, 2023, which is a continuation of U.S. patent application Ser. No. 16/923,290, filed Jul. 8, 2020, now U.S. Pat. No. 11,673,296, issued Jun. 13, 2023, which is a continuation of U.S. patent application Ser. No. 14/403,227, filed Nov. 24, 2014, now U.S. Pat. No. 10,766,170, issued Sep. 8, 2020, which is a National Phase entry of PCT Application No. PCT/AU2013/000562, filed May 29, 2013, which claims the benefit of Australian Patent Application No. 2012902224, filed May 29, 2012, which are incorporated herein by reference in their entirety.

TECHNICAL FIELD

Disclosed herein is a device for making an object and a method for making an object.

BACKGROUND

A three dimensional object can be built up one section at a time, that is layerwise. A planar layer of material is solidified in contact with the fabrication platform in the shape of a section through the object. Solidification is achieved by the application of radiation, such as electromagnetic radiation or an electron beam ("actinic radiation"). Once the section is formed, another is formed in contact with the previously formed section. Repetition of this process allows multi-laminate objects to be fabricated. This is the basis of additive fabrication techniques such as stereolithography and selective-laser-sintering.

The process requires the shaping member and the fabrication platform to be parallel and a known distance from each other. This ensures that layers of raw material, particularly the first several layers used to form an object, are of even thickness and not wedge shaped. Overly thick layers, or wedge shaped layers, may be too thick in some parts to cure throughout. Uncured layers may not attach to the fabrication platform. This may cause the fabrication process to fail.

The process also requires the shaping member and fabrication platform to be aligned to the apparatus, in particular, the radiation source. This ensures that layers of raw material are formed at the focal plane of the radiation source. Out-of-focus projection of the radiation source results in loss of fabrication tolerances and may cause the process to fail.

Known approaches to the alignment of critical components rely on dial-indicator tools or feeler gauges to measure spacing at several points. Known approaches may be iterative and error prone.

SUMMARY

Disclosed herein is a device for making an object. The device comprises a vessel for receiving a radiation hardenable material. The device comprises a fabrication platform assembly comprising a fabrication platform and having a first mode in which an orientation of the fabrication platform is adjustable and a second mode in which the orientation of the fabrication platform is fixed, and configured for positioning at the vessel in the second mode to form a layer of the radiation hardenable material when so received between the fabrication platform and a wall of the vessel. The device comprises a radiation source arranged to illuminate the layer of radiation hardenable material when so formed to form one of a plurality of layers of the object. The device comprises a guide configured to receive the fabrication platform assembly in the first mode and orientate the fabrication platform when so received with respect to the guide.

The guide may generally correct misalignment of the fabrication platform that may otherwise result in a misshaped object. Even sub degree rotational misalignments can result in substantially uneven or partially hardened layers in embodiments, especially where each of the plurality of layers is thin.

In an embodiment, the guide is configured to receive the fabrication platform in the first mode and orientate the fabrication platform when so received such that the fabrication platform is parallel with the wall of the vessel when so positioned at the vessel.

Orientating the fabrication platform to be parallel with the wall of the vessel may increase the uniformity of each of the plurality of layers, which may result in a quality object being made.

In an embodiment, the fabrication assembly comprises a fastener having a fastened state and an unfastened state. The fabrication platform assembly may be in the first mode when the fastener is in one of the fastened and unfastened states, and the fabrication assembly may be in the second mode when the fastener is in the other one of the fastened and unfastened states. The fastener may comprise at least one of a screw, a clamp and a clip. The fabrication platform may be movable about the fastener when the fastener is in the one of the fastened and unfastened states. The fastener may be a motorised fastener. The device may comprise an actuator arranged to position the platform assembly at one of the vessel and the guide. The device may comprise a controller arranged to coordinate operation of the motorised fastener and actuator.

In an embodiment, the orientation of fabrication platform is not altered by switching between the first mode and the second mode.

In an embodiment, the device comprises a biasing member arranged to bias the fabrication platform towards the guide.

In an embodiment, the device may be arranged for the guide to be below the fabrication platform and the fabrication platform is gravity biased towards the guide.

In an embodiment, the device may be arranged for removal of the vessel from a vessel receiver and the guide to be received by the vessel receiver.

In an embodiment, the guide comprises a planar surface for receiving the fabrication platform assembly in the first mode.

In an embodiment, the guide comprises a plate. The plate may be removable.

In an embodiment, the guide comprises the wall of the vessel.

An embodiment comprises a material shaping assembly comprising a material shaping member, and having a mode in which an orientation of the material shaping member is adjustable, and another mode in which the orientation of the material shaping member is fixed, the material shaping assembly being movable with the material shaping member in contact with the wall of the vessel while being in the mode in which the orientation of the material shaping member is fixed to shape the layer of radiation hardenable material, and the material shaping assembly is contactable with the guide while in the mode in which the orientation of the material shaping member is adjustable to orientate the material shaping member.

Orientating the material shaping member may correct misalignment of the material shaping member. Non uniform layers of radiation hardenable material may be avoided.

In an embodiment, the material shaping assembly is contactable with the guide while in the mode in which the orientation of the material shaping member is adjustable to cause the material shaping member to be parallel with the wall of the vessel. The controller may be arranged to coordinate operation of the motorised fastener, the actuator and the material shaping assembly.

In an embodiment, the wall of the vessel may be one of a bottom of the vessel, a side wall of the vessel, and a top wall of the vessel.

Disclosed herein is a method for making an object. The method comprises the step of putting a fabrication platform assembly in a first mode in which a fabrication platform of the fabrication platform assembly has an adjustable orientation. The method comprises the step of a guide receiving the fabrication platform assembly while in the first mode to orientate the fabrication platform with respect to the guide. The method comprises the step of putting the fabrication platform assembly in a second mode in which the orientation of the fabrication platform is fixed. The method comprises the step of positioning the fabrication platform assembly while in the second mode at a vessel containing a radiation hardenable material to form a layer of the radiation hardenable material between the fabrication platform and a wall of the vessel. The method comprises the step of illuminating the layer of radiation hardenable material with radiation to form one of a plurality of layers of the object.

An embodiment comprises repeating the steps of the method to form each of the plurality of layers of the object.

In an embodiment, the step of a guide receiving the fabrication platform assembly in the first mode to orientate the fabrication platform with respect to the guide comprises the guide orientating the fabrication platform to be parallel with the wall of the vessel when the fabrication platform assembly is at the vessel.

In an embodiment, the fabrication assembly comprises a fastener and the method comprises the step of changing the fastener between a fastened state and an unfastened state, wherein the fabrication platform assembly is in the first mode when the fastener is on one of the fastened and unfastened states, and the fabrication assembly is in the second mode when the fastener is in the other one of the fastened and unfastened states.

An embodiment comprises the step of moving the fabrication platform about the fastener when the fastener is in the one of the fastened and unfastened states.

The fastener may be a motorised fastener and the method may comprise the step of operating the motorised fastener to change the state of the motorised fastener between the fastened state and the unfastened state.

An embodiment comprises the step of biasing the fabrication platform towards the guide.

An embodiment comprises the step of gravity biasing the fabrication platform towards the guide.

An embodiment comprises the step of replacing the guide with the vessel containing radiation hardenable material.

In an embodiment, the guide comprises a plate. The plate may be removable.

In an embodiment, the guide comprises the wall of the vessel.

An embodiment comprises the steps of:

- putting a material shaping assembly in a mode in which the orientation of a material shaping member of the material shaping assembly is adjustable;
- contacting the material shaping assembly with a guide while in the mode in which the orientation of the material shaping member is adjustable to orientate the material shaping member; and
- moving the material shaping assembly with the material shaping member in contact with the wall of the vessel while in the mode in which the orientation of the material shaping member is fixed to shape the layer of radiation hardenable material.

Contacting the material shaping assembly with the guide while in the mode in which the orientation of the material shaping assembly is adjustable may cause the material shaping member to be parallel with the wall of the vessel.

In an embodiment, the wall of the vessel may be one of a bottom of the vessel, a side wall of the vessel, and a top wall of the vessel.

BRIEF DESCRIPTION OF THE DRAWINGS

In order to achieve a better understanding of a device for making an object and a method of making an object, embodiments will now be described, by way of example only, with reference to the accompanying figures in which.

DETAILED DESCRIPTION OF EMBODIMENTS

Figure 1:
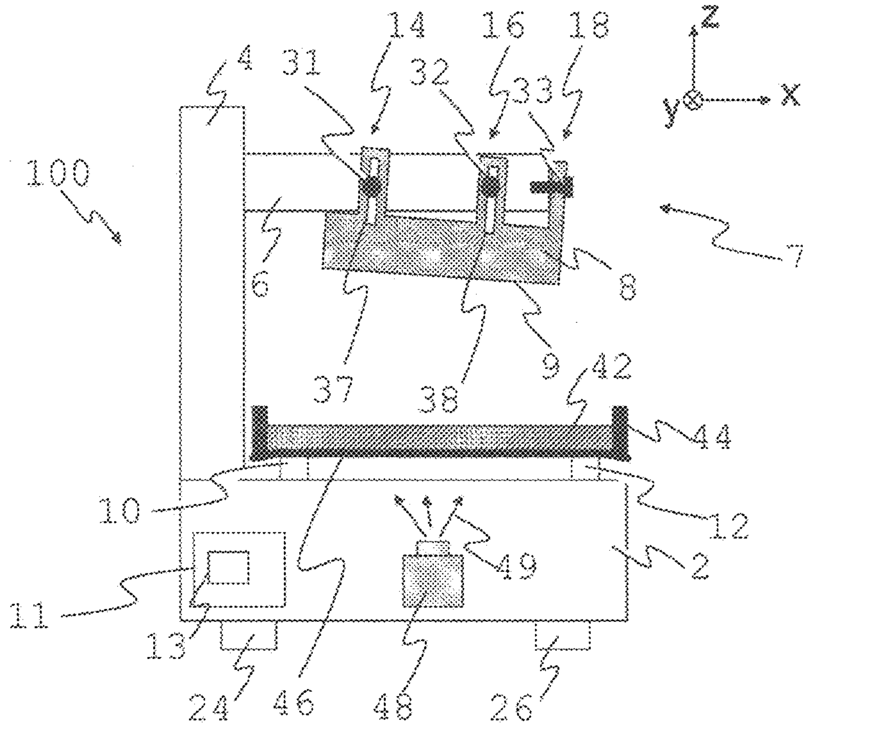
FIG. 1 shows a schematic elevation view of an embodiment of device for making an object.

FIG. 1 shows a schematic view of device for making an object layerwise, the device being generally indicated by the numeral 100. The device may be described as a stereolithography device. Coordinate axes are shown in the figure where x and y are horizontally orientated and z is vertically orientated. Another embodiment may have another orientation, however. The device 100 exhibits a mechanism for orienting certain components.

The device 100 fabricates objects by an inverted stereolithography process using layerwise deposition. The device has a controller 11, having a processor 13, that is configured to receive instructions for making the object. The instructions are in the form of data indicating a plurality of object layers to be sequentially formed by the device. The plurality of object layers are individually determined at, for example, a personal computer running suitable software. For example, the perimeter of each of the plurality of object layers may be individually determined. One individually determined layer may differ from another of the layers by, for example, the shape of their respective boundaries.

The device 100 comprises a chassis 2 with feet 24,26 for mounting the device on a surface, such as the floor or a bench-top. It comprises an actuator in the form of a linear stage 4 for moving a bracket 6 along the z-axis. At the bracket 6 is mounted a fabrication platform 8 at which objects are fabricated. The bracket 6 and the fabrication platform 8 are parts of a fabrication platform assembly 7. The object may be fabricated from a radiation hardenable material in the form of a resin 42 contained in a vessel 44. A radiation source in the form of a radiation projector 48, such as a multimedia projector or laser scanning device, projects radiation 49 at a wall of the vessel, in this but not necessarily in all embodiment the underside 46 of the vessel 44, the bottom 46 being transparent to the radiation. In alternative embodiments, the radiation may be projected at a side wall of the vessel in which case the object is built up with vertically orientated layers, or the vessel sealed and the radiation projected at a top wall of the vessel. The component parts of the apparatus may be suitably arranged to achieve this.

The resin is, in this embodiment, an actinic radiation hardenable resin in the form of a photocurable resin. The radiation is, in this embodiment, an actinic radiation in the form of ultraviolet light. Example wavelengths of suitable light include 355 nm and 405 nm. The radiation is projected selectively to harden layers of the photocurable resin 42 in the shape of sections of the object being fabricated. The hardened layers attach to the fabrication platform 8. After each layer is hardened, the linear stage 4 moves away from the vessel 44 to separate it from the upper surface of the transparent bottom 46. The linear stage 4 then positions the platform 8 proximal to the vessel bottom 46 again ready for the next layer to be hardened. The controller is configured to coordinate the movement of the linear stage and the radiation projector 48 such that the plurality of layers of hardened material are formed sequentially in accordance with the received instructions.

The linear stage 4 may comprise, for example, a platform to which the bracket 6 is attached. The platform rides at least one linear rail and is movable along the rails by a motor assembly. The motor assembly may comprise any one or more of linear motors, drive belts, stepper motors, rack and pinion arrangements, for example, or generally any suitable components arranged to provide actuation.

The vessel 44 is received by a vessel receiver having supports 10,12 which define the focal plane of the light engine 48. The bottom of the vessel may comprise a flexible sheet, which in this but not all embodiments has a unitary construction. For example, the flexible sheet may not be backed by another element. The flexible sheet may be, for example, a membrane. Alternatively, the sheet may be a composite. Examples of flexible sheet material include mylar (or some other polyester film), polycarbonate, or generally any suitable film. In alternative embodiments, however, the bottom of the vessel may comprise a rigid sheet, for example a glass or plastic sheet, or generally any other suitable rigid sheet.

Figure 2:
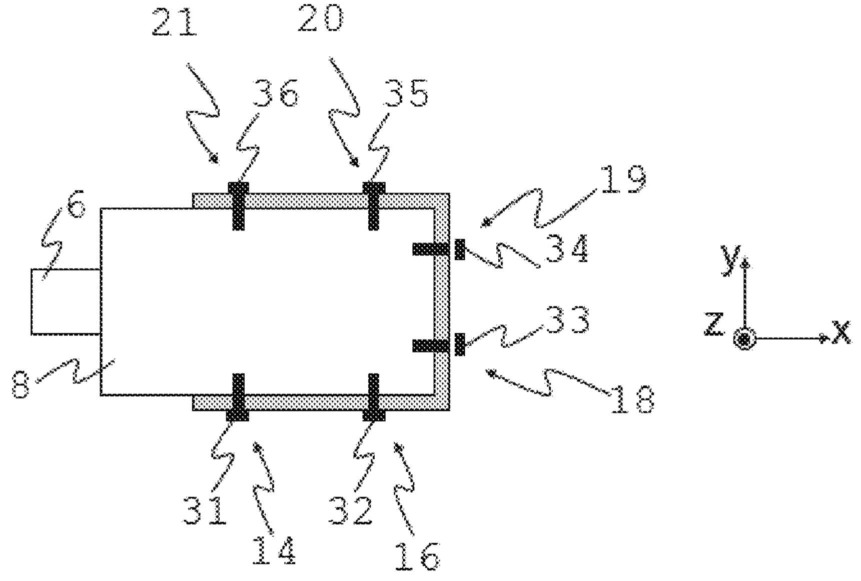
FIG. 2 shows a schematic plan view of an example bracket and an example platform at which an object is made, from the device shown in FIG. 1.

FIG. 2 shows a top-down view of the platform 8 and bracket 6. The platform 8 is fixed to the bracket 6 via joints 14,16,18,19,20,21. The joints 14,16,18,19,20,21 comprise screws 31,32,33,34,35,36, respectively, which anchor into threaded holes in the vertical side walls of bracket 6. The screws are inserted via slots (e.g. 37,38) in arms of platform 8.

When the screws 31,32,33,34,35,36 are unfastened, the platform 8 is free to rotate around axes x and y, and is also free to move in the z-direction.

When the screws 31,32,33,34,35,36 are fastened, the platform is no longer free to rotate or move and maintains its current position and orientation. The joints are arranged such that the screws provide a clamping force in a direction lateral to the direction of free movement of the unfastened joint (i.e. the clamping force is perpendicular to the length of the slot).

Alternatives to screws for fastening the joints include clips, clamps (manually operated or motorized), magnets, hydraulic actuators, and air pressure suction cups. Different fasteners may be alternatively used.

The mechanism shown in FIG. 2 contains several joints that may be redundant. For example, joints 16,18,20 may be omitted and still permit rotation about the x and y axes and movement in the z-direction. Redundant joints may provide greater rigidity in the coupling of the platform 8 to the bracket 6.

Figure 3:
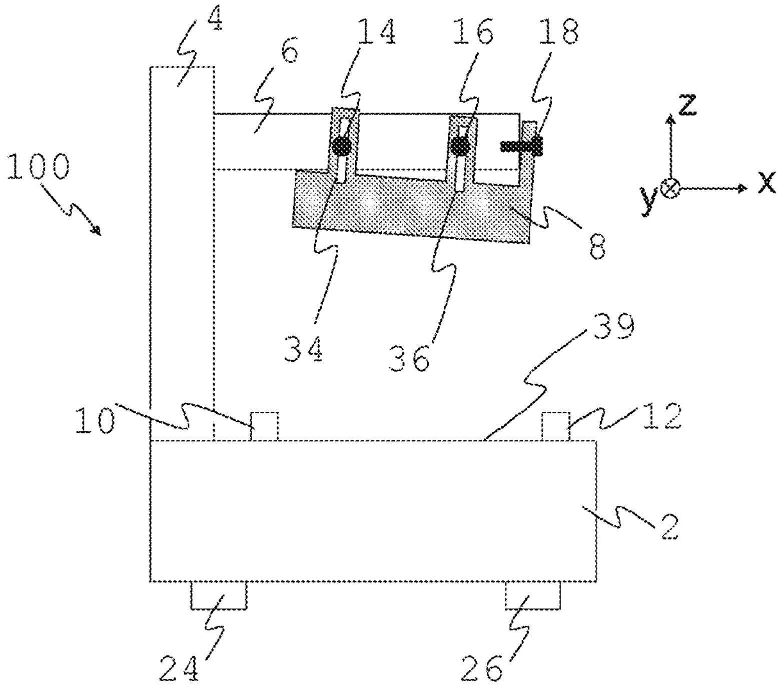
FIGS. 3 to 9 show schematic elevation views of the device of FIG. 1 in different stages of the calibration process.

The orientation of platform 8 may be calibrated by performing the following steps commencing from the configuration shown in FIG. 3, where the vessel 44 of the stereolithography device shown in FIG. 1 has been removed.

Figure 4:
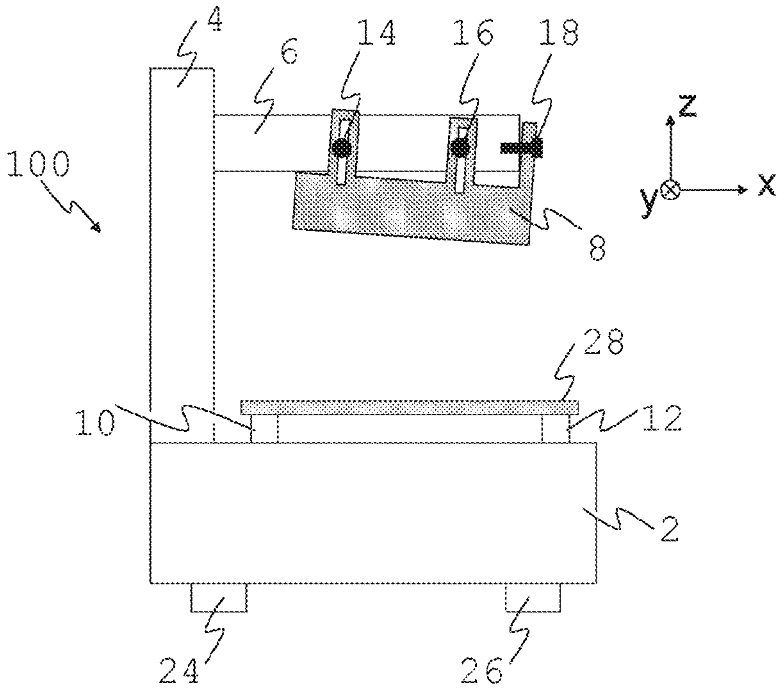

First, a guide 28, in the form of, for example, a plate of glass or aluminum of known and uniform thickness, is placed on the supports 10,12, as shown in FIG. 4.

Figure 5:
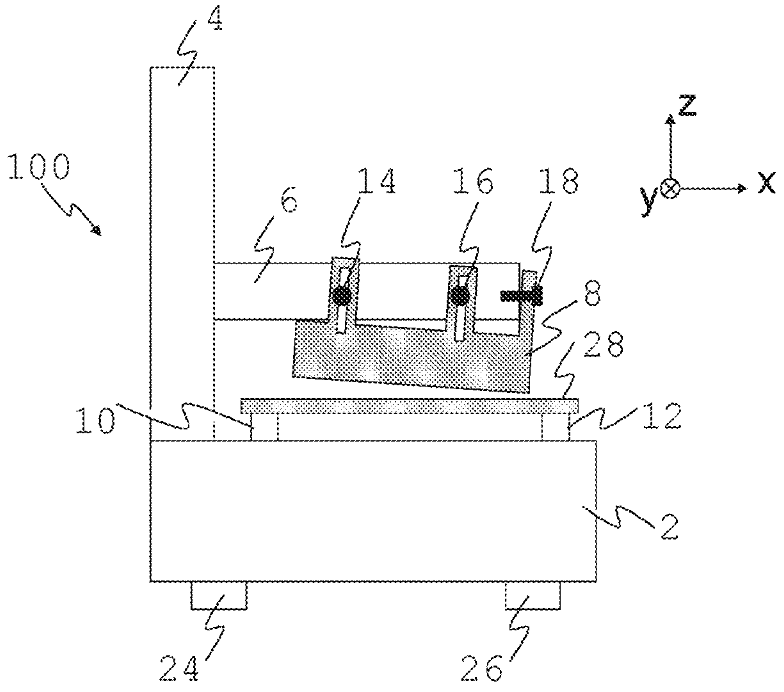

Second, the vertical linear stage 4 is activated to move the bracket 6 and platform 8 into close proximity to the guide 28, as shown in FIG. 5.

Figure 6:
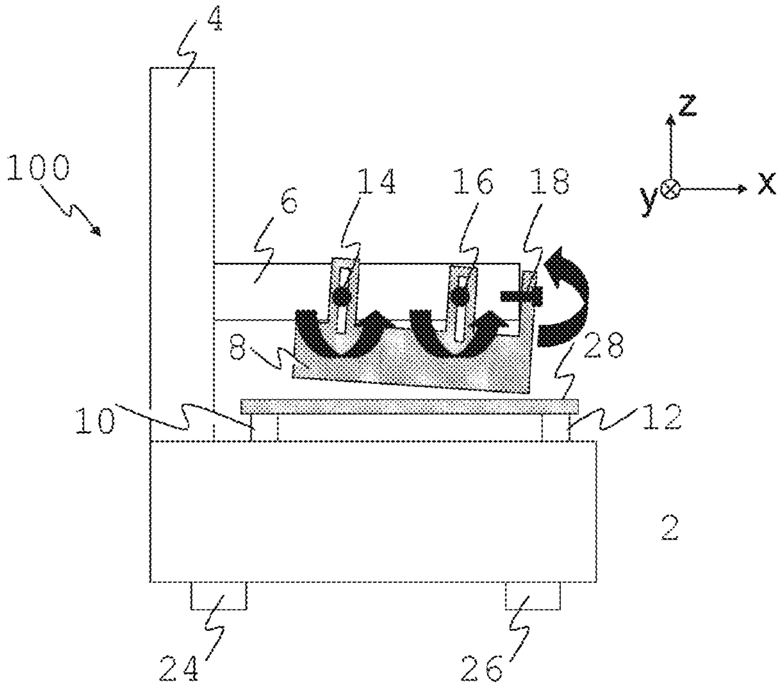
Figure 7:
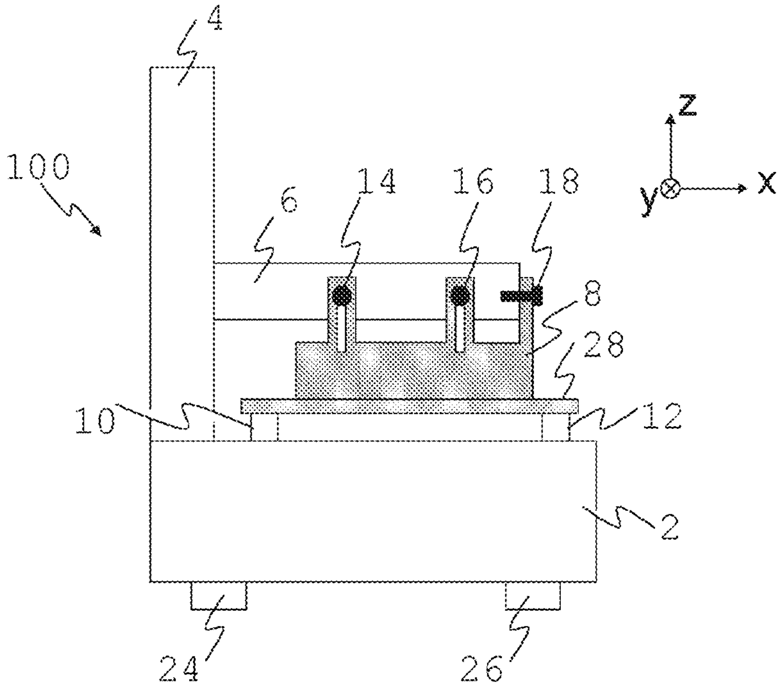

Third, the screws 31,32,33,34,35,36 which fix joints 14,16,18,19,20,21 in position are unfastened, as shown in FIG. 6. This allows the platform 8 to come to rest, by the force of gravity or other biasing means (e.g. at least one spring, a body of elastomeric material, or a person pressing the platform etc.), in a position determined by the guide, as shown in FIG. 7.

Figure 8:
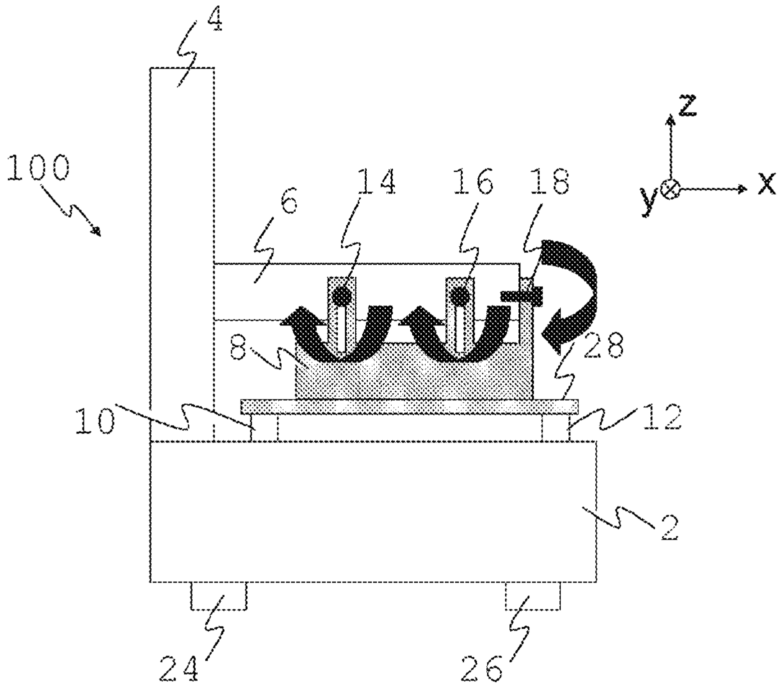

Fourth, the screws (or clips etc.) 31,32,33,34,35,36 are fastened, securing the platform 8 in its present position and orientation, as indicated in FIG. 8.

Figure 9:
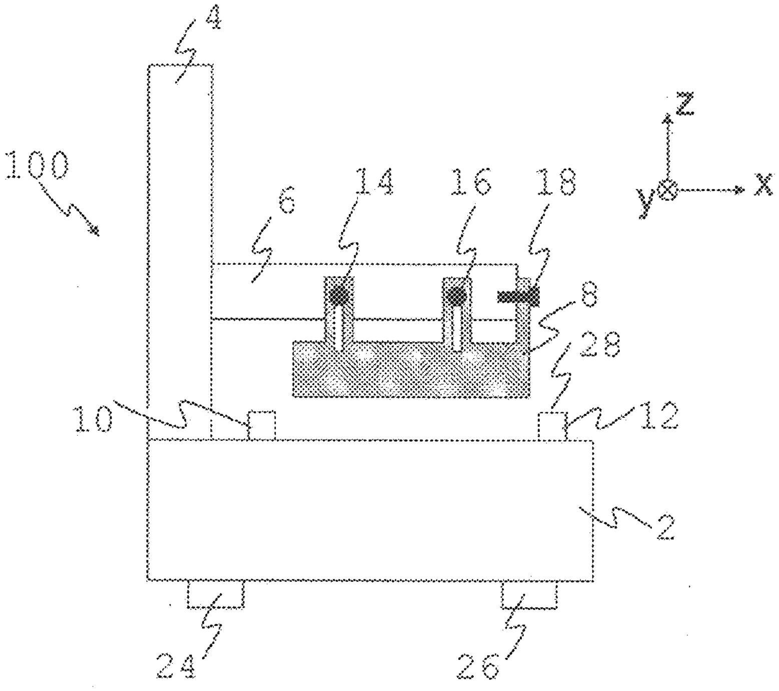

Once the screws are fastened, the guide 28 may be removed from the apparatus, as indicated in FIG. 9. It may be necessary to move the platform upwards by activating the linear stage 4 to allow the guide to be removed.

As a result of performing the steps described above, the lower surface 9 of platform 8 is oriented parallel to the supports 10,12 and is located at a known distance from the supports 10,12, the known distance being equal to the thickness of the guide. The vessel bottom has a uniform thickness, and consequently the lower surface 9 is parallel to the vessel bottom when the vessel is received by the supports.

The steps may be performed in different order to that described above. For example, the third step may be performed before the second step, that is, screws may be unfastened prior to moving the platform towards the guide.

In some embodiments the guide may be, for example, a plate with holes cut in it, or may take the form of an object with a rim or posts designed to selectively contact some parts of the platform 8 and avoid other parts of the platform. This may permit the calibration to be performed while objects are attached to the platform or vessel in place. Furthermore, the guide may be designed to be inserted against the rim of the vessel 44 (such as a plate larger than the vessel) thereby obviating the need to remove the vessel to perform the calibration. Alternatively, the guide may be in the form of a table which may sit on a surface of the stereolithography device (e.g. on surface 39 indicated in FIG. 3), possibly also over the vessel 44 or adjacent thereto. Such guides, or combinations of the guides described, may permit greater convenience in performing the calibration procedure.

In some embodiments a feature of the device may be used as the guide, for example, a glass window (e.g. located at surface 39 in FIG. 3) through which the radiation 49 passes. In such cases, it may be unnecessary to insert a guide. In some embodiments wherein the bottom of the vessel is rigid, for example comprising a glass sheet, the bottom of the vessel may serve as the guide 28 in which case the removal of the vessel may be unnecessary for calibration.

Figure 10:
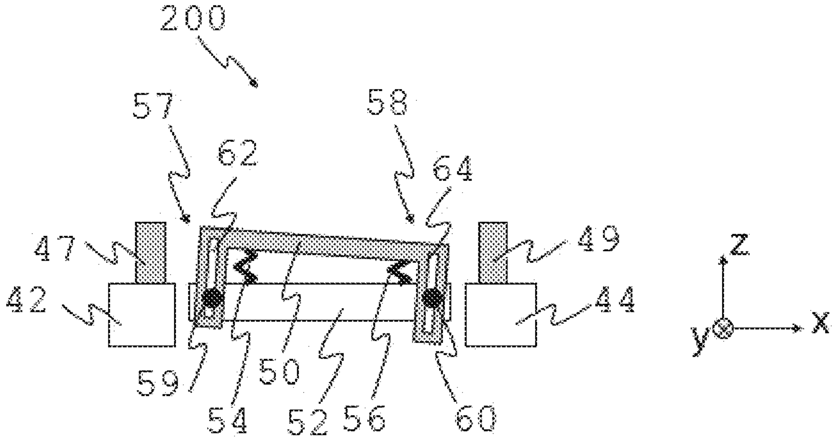
FIG. 10 shows a schematic elevation view of an example material shaper apparatus of a device of FIG. 1 comprising a mechanism for calibrating the orientation of the material shaper.

Another variant of a mechanism for performing calibrations is shown in FIG. 10. This figure which shows a material shaping assembly 200 of a stereolithography device comprising an elongate edge 50 mounted on an actuated platform 52 which moves relative to the chassis 42,44 of the device in the y-direction. The actuated platform 52 may be actuated in any suitable manner, including those described in relation to linear stage 4. A material shaping assembly such as this may be used for shaping material between the flexible bottom of the vessel and the object being made by expelling material from the space therebetween. Shaping the material flattens the bottom of a flexible sheet bottomed vessel which sits on posts 47 and 49 to, for example, ameliorate sag caused by gravity or fluid pressure. The controller is configured to coordinate the movement of the linear stage 4 and the actuated platform 52.

Figure 16:
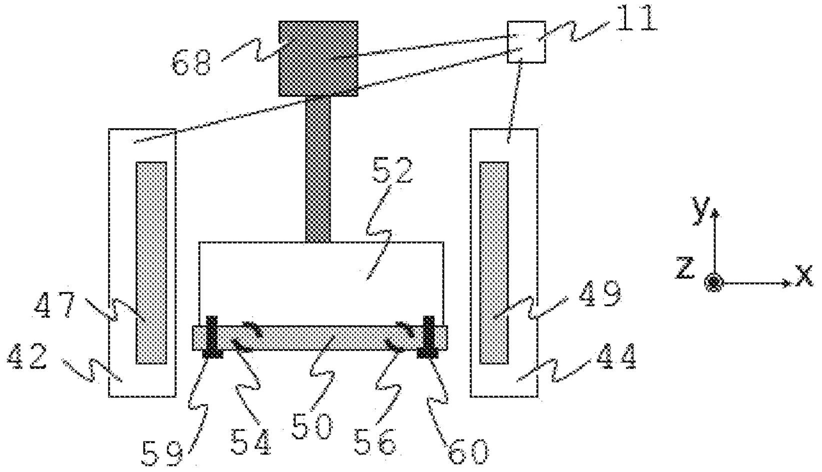

FIG. 16 shows a top-down view of the material shaping assembly showing a linear stage 68 which actuates the motion of the platform 52 in the y-direction. The linear stage 68 may comprise, for example, a platform. The platform may, for example, ride at least one linear rail and is movable along the rails by a motor assembly. The motor assembly may comprise any one or more of linear motors, drive belts, stepper motors, rack and pinion arrangements, for example, or generally any suitable components arranged to provide actuation. The platform and so the sub assembly 200 is moved, causing the edge 50 to move along the underside of flexible sheet forming the bottom of the vessel. This action lifts and shapes the flexible sheet to have it adopt a flat configuration or form while forcing excess photohardenable material 104 out of the gap between the previously hardened sections of the object being made and the flexible sheet.

The elongate edge 50 is fixed by two joints 57,58 to the platform 52. The joints comprise screws 59,60 which screw into threaded holes in platform 52 via slots 62,64 in brackets of the elongate edge 50. Springs 54,56 apply a biasing force to the elongate edge 50 in the positive z-direction.

When screws 59,60 are unfastened, elongate edge 50 is free to rotate around axis y, and is also free to move in the z-direction, and is biased towards the positive z-direction due to the force of the springs 54,56.

The position of elongate edge 50 may be calibrated level with the top surface of supports 47,49 by performing the following steps, commencing from the configuration shown in FIG. 10.

Figure 11:
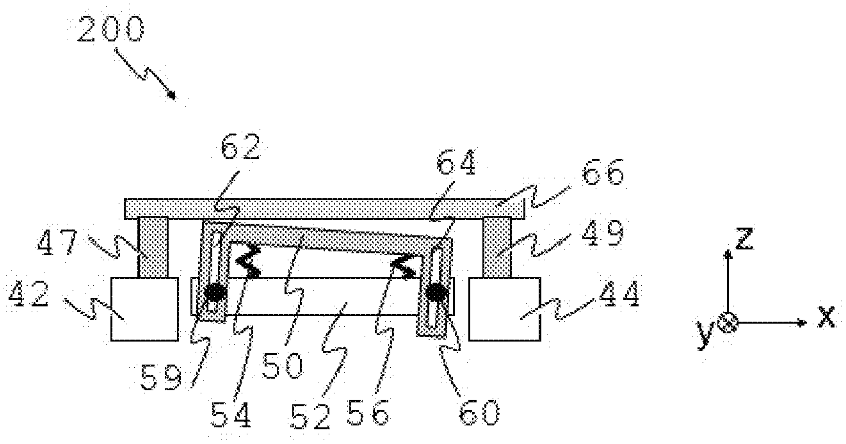
FIG. 11 shows a schematic plan view of the material shaper apparatus of FIG. 10.

First, a guide 66, such as a plate of glass or aluminum, is placed on the supports 47,49, as shown in FIG. 11.

Figure 12:
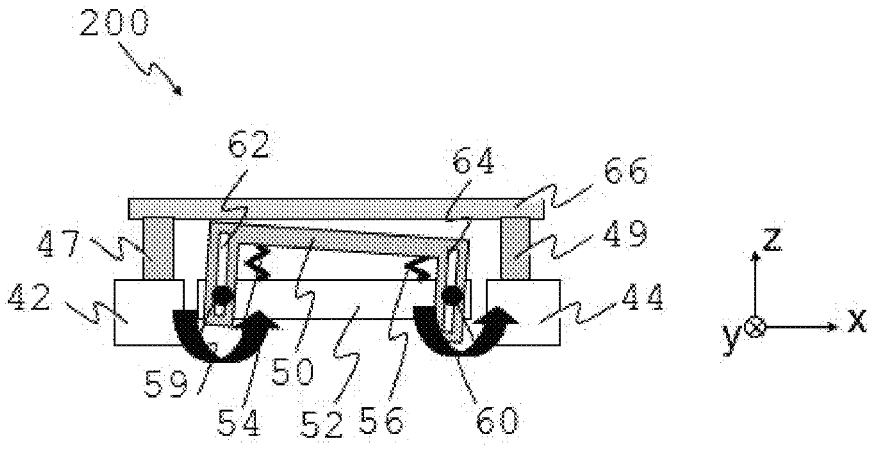
FIGS. 12 to 16 show schematic elevation views of the material shaper apparatus of FIG. 10 at different stages of the calibration process.
Figure 13:
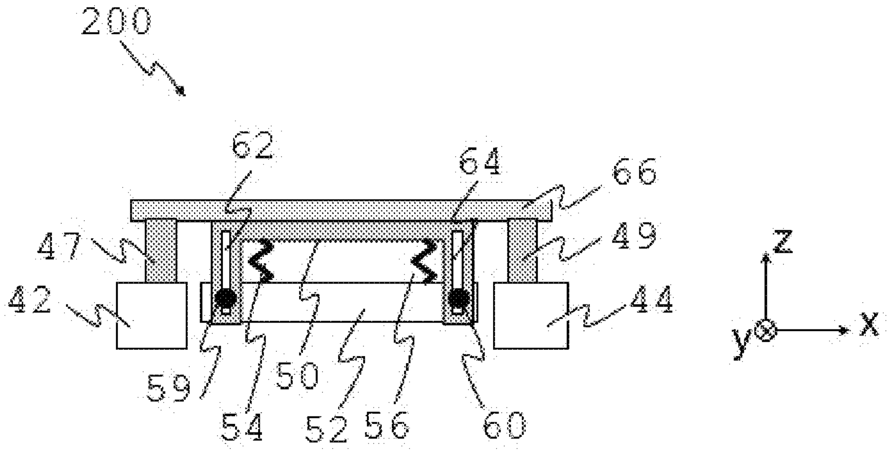

Second, screws (alternatively clips, magnets or other fasteners) 59,60 which fix joints 57,58 in position are unfastened, as shown in FIG. 12. This allows the elongate edge 50 to come to rest, by the force provided by springs 54,56 or other means (e.g. a person pressing the elongate edge etc.), against the guide 66, as shown in FIG. 13.

Figure 14:
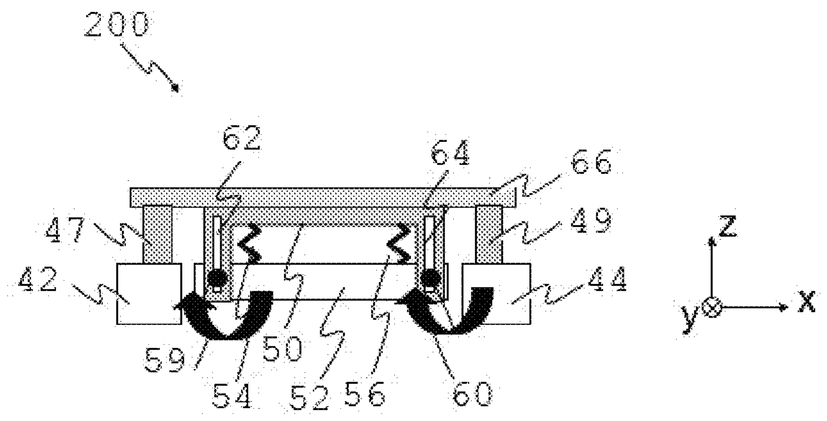
Figure 15:
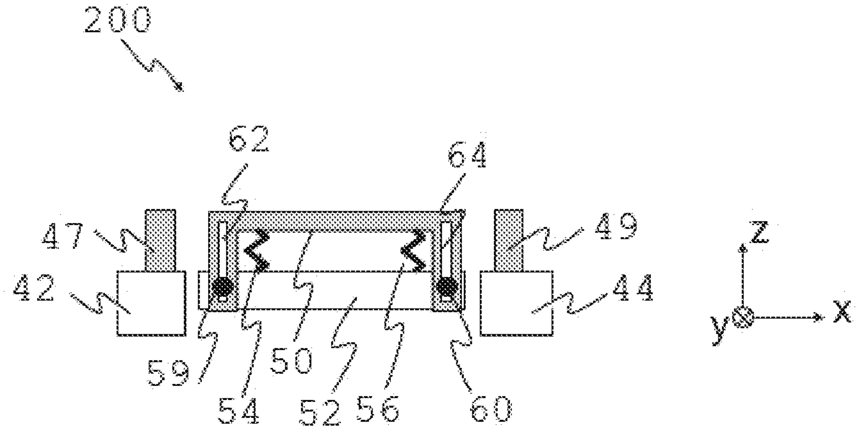

Third, the screws 59,60 are fastened, securing the elongate edge 50 in its present position and orientation, as indicated in FIG. 14. Once the screws are fastened, the reference plate 66 may be removed from the apparatus, as indicated in FIG. 15.

As a result of performing the steps described above, the surface of elongate edge 50 is oriented parallel to and located in the same plane as the top surface of the supports 47,49.

Figure 17:
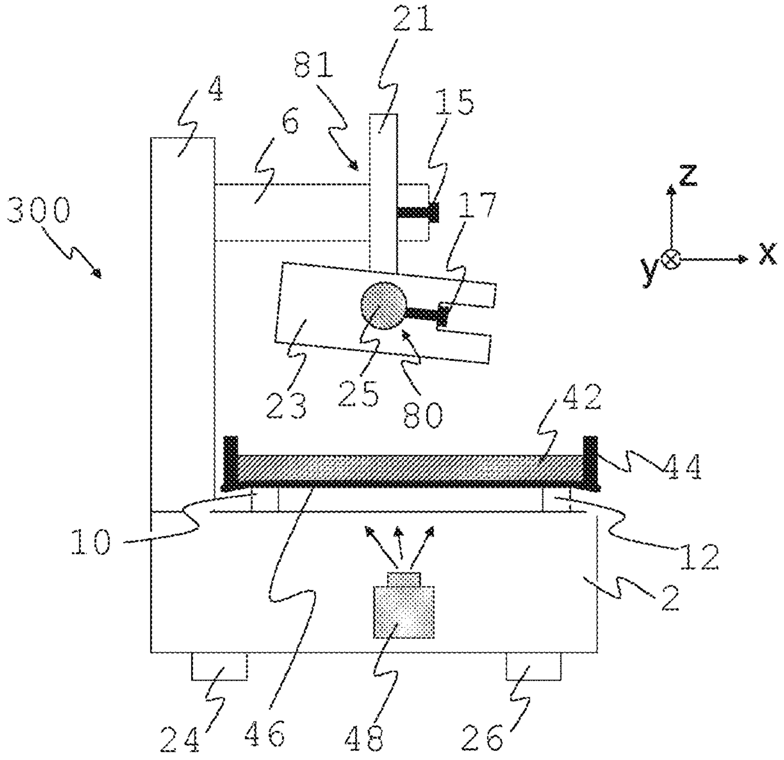
FIG. 17 shows a schematic elevation view of an embodiment of a device for making an object comprising an alternative mechanism for calibrating the orientation of the fabrication platform.
Figure 18:
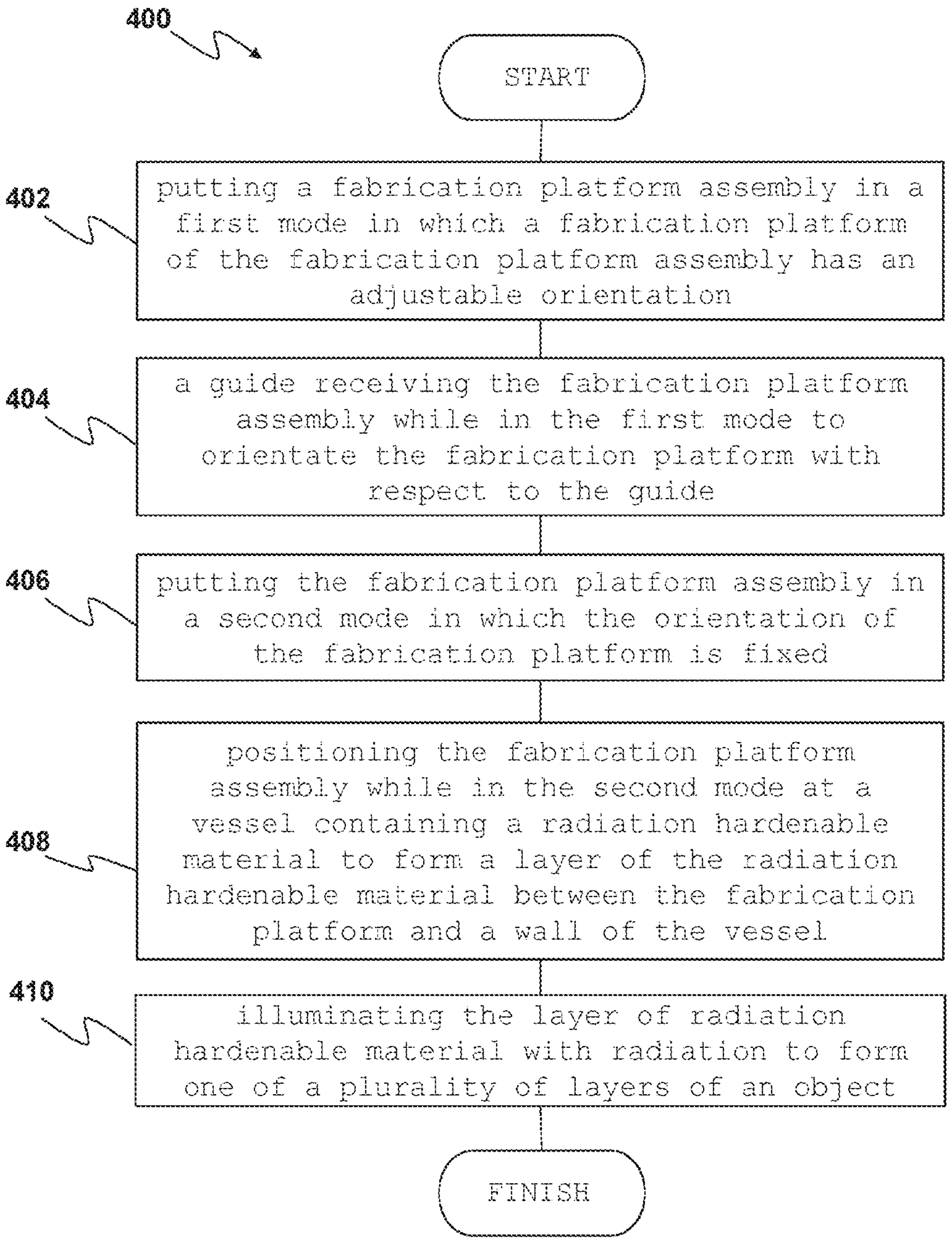
FIG. 18 shows a flow diagram for an embodiment of a method for making an object.

Embodiments may be performed with the mechanism depicted in FIG. 17, which shows selected components of a device for making an object generally indicated by 300. In this Figure, components similar in form and/or function to those in FIG. 1 are similarly numbered. Fabrication platform 23 is attached to bracket 6 via two joints 80,81. Joint 80 comprises a ball-and-socket joint having a ball 25 which fits inside a respective cavity in the platform 23. It is fastened in place by a screw 17 via a threaded hole in platform 23. Joint 81 comprises a sliding cylindrical pin 21 inserted through a respective cylindrical hole in bracket 6. It is fastened in place by a screw 15 via a threaded hole in bracket 6. In alternative embodiments, the ball-and-socket joint may be replace with two joints having orthogonal rotational axis.

When screw 17 is unfastened, joint 80 permits rotation of the platform 23 about both the x and y axes. When screw 15 is unfastened, joint 81 permits movement of platform 23 in the z-direction. Importantly, when screws 17 and 15 are fastened, platform 23 maintains its position relative to the device. The apparatus thus has the required characteristics which permit platform 23 to be aligned to the frame of the device (e.g. a plane defined by the supports 10,12) using the method described above in relation to the first embodiment.

In the embodiments described above, the calibration procedure may be automated by replacing joint fastenings with motorized fasteners, for example, motorized screw threads, fasteners operated by hydraulic cylinders, electromagnets or the like. Such motorized fasteners may be controlled by a controller. The controller 11 may have a logic device 13, for example, a microcontroller in the form of an ARM6 processor, a field programmable gate array, application specific integrated circuit, or other logic device that may be programmed with suitable software. The operation of the motorized fasteners may be coordinated by the controller with the operation of the other functions of the device, for example the upward and downward movement of the fabrication platform assembly by actuator 4, and the movement of the material shaping assembly 200.

It is understood that the platforms described above at which objects are made may be in orientations other than those shown, being, for example, inverted or mounted on a wall.

It will be appreciated that some embodiments may have some of the following advantages:

1. Critical features of devices for making objects can be oriented and aligned to the chassis of the device, which may improve the uniformity of the formed layers.
2. The orientation and alignment requires only the unfastening and fastening of joint fixtures of the apparatus, and not special measurement tools.
3. Different embodiments of the apparatus permit both planar surfaces and elongate edges to be aligned to the chassis of the device.
4. The process may be automated to enable calibration to be performed without the need for human intervention.

It will be appreciated that numerous variations and/or modifications may be made to the specific embodiments without departing from the spirit or scope of the invention as broadly described. The present embodiments are, therefore, to be considered in all respects as illustrative and not restrictive.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

It is to be understood that, if any prior art publication is referred to herein, such reference does not constitute an admission that the publication forms a part of the common general knowledge in the art, in Australia or any other country.

The invention claimed is:

1. A method for making a stereolithographic object, the method comprising:

releasing at least one fastener immobilizing at least one joint between a fabrication platform and bracket to which the fabrication platform is pivotably attached, such that the fabrication platform is pivotable with respect to the bracket;

unreleasing the at least one fastener;

disposing a radiation hardenable material into a vessel for receiving a radiation hardenable material and having an actinic radiation transparent portion transparent to the actinic radiation;

operating an actinic radiation source to generate the actinic radiation;

illuminating with the actinic radiation the radiation hardenable material through the actinic radiation transparent portion, the actinic radiation transparent portion being intermediate the stereolithographic radiation source and the fabrication platform;

translating the bracket towards the vessel and away from the vessel.

2. A method defined by claim 1 comprising pivoting the fabrication platform by contacting the fabrication platform with a guide interchangeable with the vessel.

3. A method defined by claim 1 comprising interchanging one of the vessel and a guide with the other.

4. A method defined by claim 1 comprising pivoting the fabrication vessel by contacting the fabrication platform with the vessel.

5. A method defined by claim 1 wherein releasing the at least fastener comprises operating a motor.

6. A method defined by claim 1 wherein releasing the at least one fastener comprises unfastening the at least one fastener.

7. A method defined by claim 1 wherein releasing the at least one fastener comprising turning a screw.

8. A method defined by claim 1 wherein releasing the at least one fastener comprises undoing a clamp.

9. A method defined by claim 1 wherein releasing the at least one fastener comprises undoing a clip.

10. A method defined by claim 1 wherein the at least one joint comprises a ball joint.

11. A method defined by claim 1 wherein the at least one joint comprises a sliding joint.

12. A method defined by claim 1 wherein the at least one fastener is one of a plurality of fasteners immobilizing the at least one joint.

13. A method defined by claim 1 comprising switching between a mode of a material shaping assembly and another mode of the material shaping assembly, wherein in the mode the material shaping assembly is adjustable and in the other mode the orientation of the material shaping member is fixed.

14. A method defined by claim 6 comprising moving the material shaping member into contact with a vessel while being in the mode in which the orientation of the material shaping member is fixed to shape the radiation hardenable material.

15. A method defined by claim 1 comprising forming a layer of the radiation hardenable material between the fabrication platform and the actinic radiation transparent portion.

16. A method defined by claim 15 wherein layer has a uniform thickness.

17. A method defined by claim 15 comprising illuminating the layer of the radiation hardenable material to form a layer of the stereolithographic object.

18. A method for making a stereolithographic object, the method comprising:

disposing radiation hardenable material in a vessel;

positioning a fabrication platform at the vessel to form a layer of radiation hardenable material when so received between the fabrication platform and the wall of the vessel;

operating a radiation source to generate actinic light;

illuminating the layer of radiation hardenable material to form one of a plurality of layers of the object; and switching between a mode of a material shaping assembly and another mode of the material shaping assembly, wherein in the mode the material shaping assembly of adjustable and in the other mode the orientation of the material shaping member is fixed.

19. A method defined by claim 18 comprising moving the material shaping member into contact with a vessel while being in the mode in which the orientation of the material shaping member is fixed to shape the radiation hardenable material.

20. A method defined by claim 18 wherein the layer has a uniform thickness.

* * * * *